A. SCHAEFFER.
ELECTRICALLY DRIVEN FAN.
APPLICATION FILED FEB. 6, 1912.
1,160,770. Patented Nov. 16, 1915.
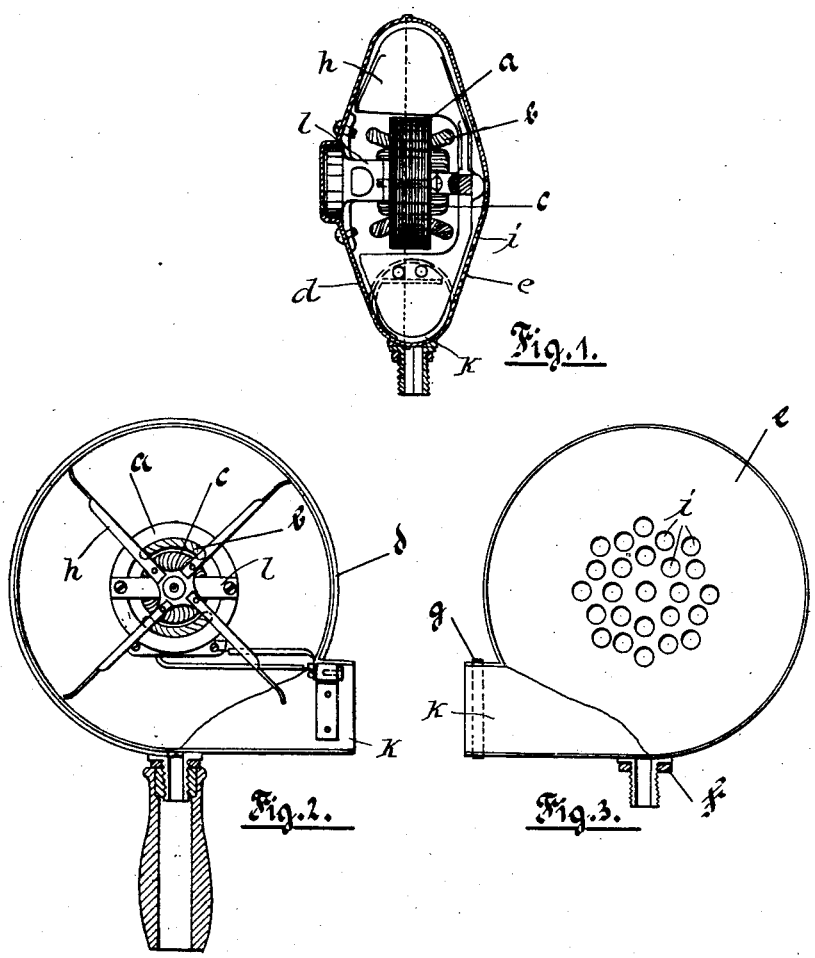

UNITED STATES PATENT OFFICE.

AUGUST SCHAEFFER, OF FRANKFORT-ON-THE-MAIN, GERMANY.

ELECTRICALLY-DRIVEN FAN.

1,160,770.        Specification of Letters Patent.        Patented Nov. 16, 1915.

Application filed February 6, 1912. Serial No. 675,888.

*To all whom it may concern:*

Be it known that I, AUGUST SCHAEFFER, a citizen of the German Empire, and residing at Moselstrasse 40, Frankfort-on-the Main, Germany, have invented a new and useful Improvement in and Connected with Electrically-Driven Fans, of which the following is a specification.

The invention relates to an electrically driven fan constructed as a hand apparatus such as are applied to warm and cold air douches. Hitherto in such devices it has been usual as for example in the parent application Serial No. 635421 to provide both the motor and blower with a special casing and these parts are inclosed in a common protecting casing which carries the air inlet and outlet as well as a handle and the electrical contacts, and the whole presents a neat external appearance. This manifold arrangement of casing however not only substantially increases the weight of the hand apparatus but also greatly increases its size. This is a considerable disadvantage especially in hand apparatus because in these the handle must be arranged on the common casing so as to get an easy balance and the result of this is that owing to the masses lying away from the center of gravity when the apparatus is put out of balance, it is necessary to exert considerable force to hold it in that position or to restore it. On the other hand it is desirable in order to avoid trouble in the operation of such apparatus in which the heating device is arranged in front of the inlet, to make the active space in the interior between the common casing and the motor and blower as large as possible. Another greater disadvantage of this apparatus, which in the same way arises from the multiplication of the casings, is the difficulty of accessibility of the parts. Owing to the high speed and temperature the delicate parts require frequent repair or at any rate must be frequently inspected. Also owing to the high speed of the air and the great amount of air sucked through the apparatus, the parts become unavoidably worn and dirty so that it is advantageous if the apparatus can be blown out and cleaned in a simple manner. The hand apparatus hitherto on the market are owing to their numerous covers quite inaccessible to the ordinary person.

According to the present invention, the parts of the fan and the electric motor overlap one another and are mounted directly in a single casing preferably lens shaped which is provided with electrical connections, with inlet and outlet and with a handle and is formed from two casing members joined together for example by engaging projections on the cover. All the bearings and supporting members of the fan and electric motor are fixed wholly on one of the casing members so that on separating the two casing members at the joint, all the driving parts are accessible for inspection, repair and for thorough cleaning. This form of hand apparatus completely avoids the above described difficulties and has the advantage of being very cheap. In consequence the arrangement of the fan blades about the motor parts leaves the utmost space which, in hot air douches with a heater in the inlet and still more in those in which the motor gives out considerable heat, renders impossible undesirable or undue heating of the outer accessible parts especially the casing. This is because owing to the continuous change of air the heat is continually conducted to the outside at once. Thus an effect is obtained which cannot be set up except by the provision of a very large operative space between the outside protecting casing and the inner parts.

The invention will first be hereinafter more particularly described with reference to the accompanying drawings, which form a part of this specification, and then be pointed out in the claims at the end of the description.

In said drawings: Figure 1 is a vertical sectional elevation of an electrically driven fan embodying my invention; Fig. 2 is a side elevation of the same partly in section but with the casing member on the near side removed so as to show the fan and motor mounted within the casing, and Fig. 3 is a side elevation of the right hand casing member detached, looking at the inner side thereof.

In carrying out my present invention, I provide a casing which incloses or surrounds both the motor and fan, and which is composed of two parts or members $d$ and $e$, adapted to fit closely together by means of a lip carried by one of said members which fits outside and overlaps the other member when the two members are brought together. Each of these casing members carries, or may have cast as an integral part thereof one-half of the outlet pipe or tube $k$, and one-half of a threaded stud or nipple onto which the handle is screwed, so that when the two parts of the casing are closed, a ring $g$ secured around the outlet pipe, and a nut or threaded washer $f$ screwed onto said stud or nipple will hold said parts together.

The casing member $d$ has mounted thereon, in any suitable manner, as by a bridge $l$ bolted thereto, the stator $a$ with its windings $b$, and the rotor $c$, said stator and rotor constituting the electric motor and having suitable electric contacts carried by the casing member $d$, the other casing member $e$ being entirely free from any connection with the motor or any of its auxiliary parts. The fan blades $h$ are secured directly upon the axle of the motor and immediately adjacent thereto, and consist of radial branches extending outwardly from the axle, and outer axial branches or extensions projecting from the ends of the radial branches, up and over the top of the motor, both branches of the fan blades following the contour of the casing and fitting as closely as possible to both the motor and the casing, without being in actual contact therewith. I thus provide a large air propelling surface within a small space and also cause the air to play around the motor and prevent heating of the same. Apertures $i$ are provided in the casing member $e$ through which the air is drawn centrally into the casing while it is thrown out centrifugally through the outlet pipe or tube $k$.

It will thus be seen that in my present invention the various parts are brought close to the center of gravity, the rotor or armature of the motor being fitted closely to the shaft whereby the effect of vibration and gyroscopic motion is largely overcome, so that the arm is not quickly tired by an effort to balance the apparatus.

Having thus described my invention what I claim as new and desire to secure by Letters Patent of the United States is:

1. In an air douche, the combination of a pair of pan-like sections joined at the edges of their open sides; said sections being provided with projecting delivery nipple members at one side, a ferrule sleeved upon said delivery nipple members of said fan casing sections and a motor carried by one of said sections.

2. In an air douche, the combination of a pair of pan-like sections joined at the edges of their open sides; said sections being provided with projecting delivery nipple members at one side, a ferrule sleeved upon said delivery nipple members of said fan casing sections, a motor carried by one of said sections, and a series of fan blades mounted on said motor.

3. In an air douche, the combination of a pair of pan-like sections joined at the edges of their open sides, and a motor carried by one of said sections, and the other of said sections being provided with inlet openings disposed around the shaft of said motor; said sections being provided with projecting delivery nipple members, together with a ferrule sleeved upon said nipple members for securing said sections together.

4. In a structure of the class described, the combination of a pair of sheet metal pan-like sections joined at the edges of their open sides, said sections being provided with delivery nipple members at one side; and a ferrule sleeved upon said delivery nipple members of said fan casing sections and constituting a member for securing said sections together.

In testimony whereof I affix hereunto my signature in the presence of two witnesses.

AUGUST SCHAEFFER.

Witnesses:
 FRIEDRICH CARL WENTZEL,
 MAX HERMANN HÖPPNER.